United States Patent [19]
Layton et al.

[11] Patent Number: 5,128,407
[45] Date of Patent: Jul. 7, 1992

[54] UREA EXTENDED POLYISOCYANATES

[75] Inventors: Heber D. Layton, Aliquippa; Howard S. Duff, Pittsburgh, both of Pa.; Kevin R. Molyneaux, Weirton, W. Va.

[73] Assignee: Miles Inc., Pittsburgh, Pa.

[21] Appl. No.: 735,502

[22] Filed: Jul. 25, 1991

[51] Int. Cl.$^5$ ............................................. C08G 18/38
[52] U.S. Cl. ............................... 524/839; 252/182.2; 427/389.9; 427/392; 427/393; 528/68
[58] Field of Search .................... 524/839; 528/68; 252/182.2; 427/389.9, 392, 393

[56] References Cited
U.S. PATENT DOCUMENTS
3,870,665  3/1975  Diehr et al. .................. 260/17.2

FOREIGN PATENT DOCUMENTS
1387454  3/1975  United Kingdom .

Primary Examiner—Maurice J. Welsh
Attorney, Agent, or Firm—Joseph C. Gil; Godfried R. Akorli

[57] ABSTRACT

Disclosed herein is a stable fluid mixture and a binding composition containing the same; said mixture comprises a polyisocyanate and a solution of urea in water which is characterized in that the urea is premixed with water before it is admixed with the polyisocyanate to make a urea extended polyisocyanate.

14 Claims, No Drawings

UREA EXTENDED POLYISOCYANATES

BACKGROUND OF THE INVENTION

1. Field of the Invention

The present invention relates to chain extended polyisocyanates and their use as adhesives in making composite materials such as fiber, particle, wafer and strand boards, and plywood. More specifically, the present invention relates to urea extended polyisocyanates.

2. Brief Description of the Prior Art

Composite materials are made by spraying comminuted lignocellulose materials such as fibers, particles, wafers or strands with a binder composition while the comminuted materials are blended by tumbling or agitating them in a blender or like apparatus. After blending sufficiently to form a uniform mixture, the materials are formed into a loose mat. Plywood production is accomplished by roll coating, curtain coating or spraying a binder composition onto veneer surfaces. A plurality of veneers are then laid-up to form sheets of required thickness. The mats or sheets are then placed in a heated press and compressed to effect consolidation and curing of the materials into a board.

The use of polyisocyanates as binders and/or impregnating agents for lignocellulose materials has been proposed with a view to increasing the moisture stability of the materials as well as their mechanical strength. In addition to their quality improving properties, polyisocyanates have far reaching process technical advantages when used as binders, as have been disclosed in German Offenlegungsschrift No. 2,109,686.

U.S. Pat. No. 3,870,665 discloses the use of polyisocyanates and catalysts therefor in the manufacture of plywood, fiberboard, and other compression molded articles.

The large scale industrial manufacture of composite materials which are bonded exclusively with polyisocyanates have previously been limited. The use of some of the polyisocyanates, particularly the better performing isocyanates, such as polymethylene diisocyanate has been limited by their cost. Because of the cost constraints, the level of use of these expensive isocyanates is kept low for a given material. One approach to the use of levels of these isocyanates has involved chain extending the isocyanates with inexpensive extenders.

By the present invention, there is provided an inexpensive but effective urea extended polyisocyanate.

SUMMARY OF THE INVENTION

In accordance with the foregoing, the present invention encompasses a stable, fluid mixture of a polyisocyanate and a solution of urea in water; said mixture is characterized in that the urea is premixed with water before it is admixed with the polyisocyanate. The invention also encompasses a binding composition comprising urea extended polyisocyanate which is derived from a combination of a polyisocyanate and urea which is in solution with water, and the processes for preparing the fluid mixture and the the binding composition. Further encompassed by the invention is a process for preparing a composite material from comminuted particles or veneers of a lignocellulose material comprising coating the particles or veneers with the binding composition of the invention. Further encompassed by the invention is the composite material prepared in accordance with the invention.

DETAILED DESCRIPTION OF THE INVENTION

Surprisingly, the mixture of the polyisocyanate and urea in solution with water was found to be stable and thus provides a facile and less expensive means for preparing a binding composition comprising urea extended polyisocyanates such as polymethylene diphenyl diisocyanates (PMDI) of the invention. As set forth herein, the claimed invention encompasses a stable, fluid mixture comprising a polyisocyanate and a solution of urea in water. By the term "stable" herein is meant that the mixture of polyisocyanate, urea and water has sufficient shelf-life, particularly at ambient temperature, to remain useful as a binding composition. Illustratively, the mixture remains in a fluid form that can be easily applied by, say, pouring or spraying.

In preparing the mixture, a solution of urea in water is formed by premixing these two ingredients. Water is employed in an amount sufficient to form a solution of urea in water. The term "solution" as used herein may denote other forms of the mixture, e.g., dispersions or emulsions. Typically the weight ratio of water to urea can be from about 99:1 to 1:1 and preferably from about 2:1 to 1:1. The resultant solution of urea in water is then admixed with the polyisocyanate by, slowly adding the solution, while mechanically stirring the polyisocyanate. The weight ratio of the polyisocyanate to the solution of urea in water can be from about 99:1 to 1:1.5.

The polyisocyanates useful herein can be an aliphatic, cycloaliphatic, aromatic, araliphatic or a mixture thereof. Specific but non-limiting examples of the polyisocyanates can be selected from the group consisting of alkylene diisocyanates such as tetramethylene diisocyanate, hexamethylene diisocyanate, cyclohexane-1,4-diisocyanate; arylene diisocyanates and their alkylation products such as phenylene 1,3-diisocyanate, phenylene 1,4-diisocyanate, naphthylene diisocyanates, diphenyl methane diisocyanates, toulene diisocyanates, di- or triisopropylbenzene diisocyanates and triphenylmethane triisocyanates, triesters of p-isocyanatophenylthiophosphoric acid, p-isocyanatophenylphoshoric acid; aralkyldiisocyanates such as 1-(isocyanatophenyl)-ethylisocyanate or alkylene diisocyanates. Polyisocyanates which are substituted with various substituents such as alkoxy or nitro groups or chlorine or bromine atoms may also be used. Polyisocyanates which have been modified with less than equivalent quantities of polyhydroxyl compounds such as trimethylolpropane, butanediol, glycerol or hexane-1,2,6-triol are also suitable. The polyphenyl-polymethylene polyisocyanates are preferred. Other suitable polyisocyanates are disclosed by Saunders and Frisch in the book, *Polyurethanes: Chemistry and Technology*, published by Interscience Publishers, copyright 1964, the disclosure of which is incorporated herein by reference.

Isocyanates which contain carbodiimide, uretdione, uretone imine and isocyanurate groups may also be used. Mixtures of the various isocyanates may, of course, also be used, and according to German Offenlegungsschrift No. 2,109,686, the residues obtained from the distillation of crude commercial diisocyanato-toluene isomer mixtures as well as monoisocyanates such as phenyl isocyanate or naphthyl isocyanate may be included. Other suitable isocyanates include e.g. polyisocyanates which are masked with phenols, oximes or bisulphite, and the reaction products which contain isocyanate groups obtained by reacting polyisocyanate with less than equivalent quantities of acetals such as methylol, as well as isocyanates with isocyanurate rings.

Other suitable polyisocyanates are disclosed in the book by Saunders and Frisch identified above. In the process according to the invention, conventional binders based on ureaformaldehyde melamine formaldehyde and phenolformaldehyde condensates may be used as mixtures or separately in addition to the binders and/or impregnating agents which are based on isocyanates. The weight ratio of polyisocyanate to urea can be from about 9.5:05 to 1:1 and preferably 9.5:05 to 7:3.

As set forth herein, the polyisocyanate and preferably diphenyl methane diisocyanate is blended with a solution of urea in water to produce the stable mixture of the invention. Viscosity of the mixture can be from 100 to 5000 centipoises measured with a Brookfield No. 2 spindle at 25 degrees Centigrade.

In the practice of the claimed invention, the amount of binding composition would depend on the kind of materials that are being formed into a composite, the moisture content and the like. Typically the binding composition can be employed in an amount of 1 to 25 and preferably 2 to 10 percent solids by weight based on oven dry weight of the wood.

Optional ingredients that can be employed with the binding composition can be auxiliary agents such as catalysts, wax emulsions, preservatives and surface active additives, e.g., emulsifiers and stabilizers. In the embodiment of the invention wherein the urea content is high, an emulsifier such as a silicone surfactant can be employed in an amount sufficient to provide a binding composition having a working viscosity. By the term "working viscosity" is meant the viscosity of the composition is such that the composition can be applied by, say pouring or spraying, under service conditions.

The process for preparing the composite material from comminuted particles of fiber, wood or cellulosic materials comprises coating the particles with the binding composition of the claimed invention containing a urea extended polyisocyanate.

Usually, the reconstituted composite panels are fabricated by spraying the comminuted materials with a binder composition while the materials are tumbled or agitated in a blender or like mixing apparatus. Generally the binder system is added in an amount equal to 2-25 percent by weight of the lignocelluose material based on the dry weight of the particles. If desired, other material such as fire retardants, preservatives, biocides and the like, may also be added to the materials during the blending stage.

After blending sufficiently to form a uniform mixture, the coated materials are formed into a loose mat preferably containing between about 4 percent and 18 percent moisture by weight. The mat is then placed in a heated press (300°-450° F.) between caul plates and compressed (300-700 psi) to consolidate the materials into a board. Pressing times, temperatures, and pressures may vary widely, depending on the thickness of the board produced, the desired density of the board, the size of the particles used and other factors well known in the art.

Specific examples of suitable raw materials containing lignocellulose which may be bound with the binders according to the invention include: wood, bark, cork, bagasse, straw, flax, bamboo, alfalfa, rice husks, sisal fibers and coconut fibers. However, pressed articles may also be produced according to the invention from other organic (for example, plastic scraps of various types) and/or inorganic raw materials (for example, expanded mica or silicate beads). In this case, the material may be present in the form of granules, shavings, fibers, beads or dust and may have a moisture content of, for example, from 0 to 35% by weight.

The invention is further illustrated but is not intended to be limited by the following examples in which all parts and percentages are by weight unless otherwise specified.

EXAMPLES

The following examples utilize particle and strand furnish or veneers. It is anticipated that all forms of comminuted wood such as fibers, particles, strands or wafers can be likewise employed.

EXAMPLE 1

A solution of 4 parts of urea in 6 parts of water was prepared by dissolving the urea in water. 7.5 parts of this solution was added slowly to Mondur 541 (PMDI available from Mobay Corporation) while stirring with an mechanical mixer to produce a mixture consisting of 7 parts PMDI, 4.5 parts of water and 3 parts urea. A thick emulsion resulted. This emulsion was slowly poured into a batch particleboard blender available from LODIGE CO., charged and with commercial, softwood particleboard furnish. The emulsion was added at a 4% solids binder level based on the oven dry weight of the wood furnish. One percent of a 50% solids wax emulsion "Paracol 8ION" from Hercules was also added to the batch.

The blender was operated for four minutes to ensure good binder distribution. The furnish was then hand formed into a mat in a deckle box. The resulting mat was pressed at 350° F. to half inch stops for 4½ minutes. Properties for the resulting board are shown in Table I.

EXAMPLE 2 (COMPARATIVE)

The procedure of Example 1 was repeated except that the binder was neat PMDI. Properties for the resulting board are shown in Table 1 as a 4% control.

EXAMPLE 3

The procedure for binder preparation of Example 1 was followed with the exception of an addition of 0.75% (based on PMDI) of a silicone surfactant to the PMDI prior to adding the water/urea solution. This greatly reduced the viscosity of the emulsion allowing it to be spray applied. The emulsion was air atomized onto strands while being tumbled in a laboratory rotary drum blender. Binder level was 3% solids. One percent of a 50% solids wax emulsion (available from Hercules as "Paracol 8ION") was also added. The pressing schedule of Example 1 were followed. Properties of the resulting waferboard are listed in Table 2.

EXAMPLE 4

The procedure of Example 3 was followed with the exception that the binder emulsion consisted of 9 parts PMDI, 1.57 parts water and 1 part urea. Properties of the resulting waferboard are listed in Table 2.

EXAMPLE 5

The procedure of Example 3 was followed with the exception that the binder emulsion consisted of 95 parts PMDI, 7.5 parts water and 5 parts urea. Properties of the resulting waferboard are listed in Table 2.

TABLE 1

| Binder[1] Level | Density (pcf)[2] | IB(psi)[3] | Static Bending | | 2 Hr Boil % TS[6] |
|---|---|---|---|---|---|
| | | | MOR(psi)[4] | MOE(psi)[5] | |
| 4% (30% urea) | 50.3 | 289 | 3146 | 472,100 | 35% |
| 4% (control) | 49.0 | 265 | 3697 | 524,600 | 32% |

[1] Solids based on oven dry weight of wood
[2] Pounds per cubic foot
[3] Internal bond
[4] Modulus of Rupture
[5] Modulus of Elasticity
[6] Thickness swell after a 2 hour boil

TABLE 2

| Binder Level | Density(pcf) | IB(psi) | MOR(psi) | MOE(psi) | 24 Hr. Soak % TS | 2 Hr. Boil | |
|---|---|---|---|---|---|---|---|
| | | | | | | % TS | % MOR Retained |
| 3% (30% urea) | 43.0 | 63 | 5501 | 778,200 | 25 | 68 | 29 |
| 3% (10% urea) | 45.4 | 90 | 5377 | 743,200 | 18 | — | — |
| 3% (5% urea) | 42.2 | 105 | 6441 | 786,500 | 19 | — | — |
| 3% control | 46.9 | 120 | 5502 | 713,500 | 18 | — | — |
| 2.5% control | 42.0 | 53 | 5709 | 657,000 | 22 | 52 | 39 |
| 2% control | 41.0 | 42 | 5007 | 651,200 | 22 | 56 | 41 |

Although the invention has been described in detail in the foregoing for the purpose of illustration, it is to be understood that such detail is solely for that purpose and that variation can be made therein by those skilled in the art without departing from the spirit and scope of the invention except as it may be limited by the claims.

What is claimed is:

1. A stable, fluid mixture comprising a polyisocyanate and a solution of urea in water which is characterized in that the urea is premixed with water before it is admixed with the polyisocyanate.

2. The stable fluid mixture of claim 1 wherein the polyisocyanate is polymethylene diphenyl diisocyanate or toluene diisocyanate.

3. The stable fluid mixture of claim 1 wherein the weight ratio of water to urea is from about 99:1 to 1:1.

4. The stable fluid mixture of claim 3 wherein the weight ratio of water to urea is from about 2:1 to 1:1.

5. The stable fluid mixture of claim 1 wherein the weight ratio of urea to polyisocyanate is from 9.5: 0.5 to 1:1.

6. A binding composition comprising a urea extended polyisocyanate which is derived from a combination of a polyisocyanate and urea which is in solution with water.

7. The binding composition of claim 6 wherein the polyisocyanate is polymethylene diphenyl diisocyanate or toluene diisocyanate.

8. The binding composition of claim 6 wherein the ratio of water to urea is from about 99:1 to 1:1.

9. The binding composition of claim 8 wherein the weight ratio of water to urea is from about 2:1 to 1:1.

10. The binding composition of claim 6 wherein the weight ratio of polyisocyanate to urea is about 9.5:0.5 to 1:1.

11. The binding composition of claim 6 which further comprises a surfactant.

12. A process for preparing a urea extended polyisocyante comprising premixing urea with water to form a solution of urea in water, followed by admixing the solution of urea in water with a polyisocyanate.

13. A process for preparing a composite material from comminuted particles of fiber, wood or cellulosic materials or veneers comprising coating the particles or veneers with a binding composition containing a urea extended polyisocyanate of claim 5.

14. A composite material which is prepared by the process of claim 13.

* * * * *